(12) United States Patent
　　　Pi

(10) Patent No.: US 9,720,534 B2
(45) Date of Patent: Aug. 1, 2017

(54) CAPACITIVE TOUCH SENSOR PARTIALLY INTEGRATED WITH LCD DISPLAY

(71) Applicant: Shenzhen Huiding Technology Co., Ltd., Shenzhen (CN)

(72) Inventor: Bo Pi, Carlsbad, CA (US)

(73) Assignee: SHENZHEN HUIDING TECHNOLOGY CO., LTD., Shenzhen (CN)

( * ) Notice: Subject to any disclaimer, the term of this patent is extended or adjusted under 35 U.S.C. 154(b) by 128 days.

(21) Appl. No.: 14/364,374

(22) PCT Filed: Dec. 21, 2012

(86) PCT No.: PCT/US2012/071413
　§ 371 (c)(1),
　(2) Date: Jun. 11, 2014

(87) PCT Pub. No.: WO2013/096860
　PCT Pub. Date: Jun. 27, 2013

(65) Prior Publication Data
　US 2014/0313164 A1　Oct. 23, 2014

Related U.S. Application Data

(60) Provisional application No. 61/579,638, filed on Dec. 22, 2011.

(51) Int. Cl.
　*G06F 3/041*　(2006.01)
　*G02F 1/1333*　(2006.01)
　*G06F 3/044*　(2006.01)

(52) U.S. Cl.
　CPC ........ *G06F 3/0412* (2013.01); *G02F 1/13338* (2013.01); *G06F 3/044* (2013.01);
　(Continued)

(58) Field of Classification Search
　CPC ......... G06F 3/041; G06F 3/045; G06K 11/06; G08C 21/00; G01R 27/26
　(Continued)

(56) References Cited

U.S. PATENT DOCUMENTS 7,920,129 B2　4/2011　Hotelling et al.
7,995,041 B2　8/2011　Chang
(Continued)

FOREIGN PATENT DOCUMENTS

CN　　101424855 B　6/2010
CN　　101943977 A　1/2011
(Continued)

OTHER PUBLICATIONS

International Search Report in the parent PCT application No. PCT/US2012/071413, dated Mar. 12, 2013.
(Continued)

*Primary Examiner* — Pegeman Karimi
(74) *Attorney, Agent, or Firm* — Chen Yoshimura LLP

(57) ABSTRACT

A capacitive touch sensor (touch sensitive panel or screen) partially integrate with an LCD is disclosed. The touch sensor includes an LCD panel and a single layer of transparent conductive traces above the LCD panel. One group of signal traces of the LCD panel, either the gate signal traces or the source signal traces, is used to emit signals that function as the excitation signals of the touch sensor, and the single layer of transparent conductive traces is used to detect the signals to sense touches. The single layer of transparent conductive traces may be form on a flexible medium and affixed to the upper surface of the LCD panel. The LCD panel may be similar to a conventional LCD panel except that the driver circuit is modified so that the gate or source signals are used, in a time-division manner, as excitation signals of the touch sensor.

20 Claims, 8 Drawing Sheets

(52) U.S. Cl.
CPC .. *G06F 3/0416* (2013.01); *G06F 2203/04103* (2013.01); *G06F 2203/04104* (2013.01)

(58) Field of Classification Search
USPC ................... 178/18.01–18.06; 345/175, 174
See application file for complete search history.

(56) References Cited

U.S. PATENT DOCUMENTS

| | | | |
|---|---|---|---|
| 8,040,326 | B2 | 10/2011 | Hotelling et al. |
| 2008/0018613 | A1 | 1/2008 | Kim et al. |
| 2008/0062139 | A1 | 3/2008 | Hotelling et al. |
| 2009/0195511 | A1* | 8/2009 | Cites ........................ G06F 3/044 345/173 |
| 2010/0194697 | A1 | 8/2010 | Hotelling et al. |
| 2010/0265207 | A1* | 10/2010 | Chen ..................... G06F 3/0412 345/174 |
| 2011/0007019 | A1 | 1/2011 | Tasher |
| 2011/0316809 | A1* | 12/2011 | Kim ...................... G06F 3/0412 345/174 |
| 2012/0038585 | A1* | 2/2012 | Kim ...................... G06F 3/0412 345/174 |
| 2013/0050130 | A1* | 2/2013 | Brown .................... G06F 3/044 345/174 |
| 2014/0340349 | A1* | 11/2014 | Liu ......................... G06F 3/041 345/174 |
| 2015/0324036 | A1* | 11/2015 | Schwartz ............. G06F 3/0416 345/174 |

FOREIGN PATENT DOCUMENTS

| | | |
|---|---|---|
| CN | 102073409 A | 5/2011 |
| CN | 102222475 A | 10/2011 |
| TW | 201001253 A1 | 1/2010 |

OTHER PUBLICATIONS

IPRP in the parent PCT application No. PCT/US2012/071413, dated Jun. 24, 2014.
Chinese Office Action, dated Dec. 17, 2015 in a counterpart Chinese patent application, No. CN 2012800627572.
Chinese Office Action, dated Apr. 19, 2016 in a counterpart Chinese patent application, No. CN 201280062757.2.

* cited by examiner

CAPACITIVE TOUCH SENSOR PARTIALLY INTEGRATED WITH LCD DISPLAY

BACKGROUND OF THE INVENTION

Field of the Invention

This invention relates to a capacitive touch sensor, and in particular, it relates to a capacitive touch sensor integrated with an LCD or other types of display.

Description of the Related Art

Traditional capacitive touch sensors usually have two layers of transparent conductive traces. The traces are typically arranged perpendicular to each other. This type of capacitive sensors typically requires two patterned ITO layers, along with other conductive traces to route the signals. These ITO layers can be implemented either on two side of a single substrate or on one side of two different substrates, where the two substrates are bonded together. In a typical implementation, one layer of the traces is used to emit excitation signals, and other layer of traces is used to detect these signals to sense the presence of a finger or other object. An example of a double-sided touch sensitive panel is described in U.S. Pat. No. 7,920,129.

Almost all capacitive touch sensors are used together with LCD display panels, and are located above the LCD display panel. Touch screen integrated with LCD display have also been described. For example, U.S. Pat. No. 7,995,041 describes an "displays with touch sensing circuitry integrated into the display pixel stackup . . . Circuit elements, such as touch signal lines, such as drive lines and sense lines, grounding regions, in the display pixel stackups can be grouped together to form touch sensing circuitry that senses a touch on or near the display. An integrated touch screen can include multi-function circuit elements that can operate as circuitry of the display system to generate an image on the display, and can also form part of a touch sensing system that senses one or more touches on or near the display. The multi-function circuit elements can be, for example, capacitors in display pixels that can be configured to operate as storage capacitors/electrodes, common electrodes, conductive wires/pathways, etc., of the display circuitry in the display system, and that may also be configured to operate as circuit elements of the touch sensing circuitry." (Abstract.) FIG. 7 of this patent shows a cross-sectional view of the display pixels.

U.S. Pat. No. 8,040,326 describes an integrated in-plane switching display and touch sensor. "This relates to adding multi-touch functionality to a display without the need of a separate multi-touch panel or layer overlaying the display. Instead, embodiments of the invention can advantageously utilize existing display circuitry to provide multi-touch functionality while adding relatively little circuitry that is specific to the multi-touch functionality. Thus, by sharing circuitry for the display and the multi-touch functionalities, embodiments of the invention can be implemented at a lower cost than the alternative of superimposing additional multi-touch related layers onto an existing display panel. Furthermore, since the display and multi-touch functionality can be implemented on the same circuit, they can be synchronized so that noise resulting from the display functionality does not detrimentally affect the multi-touch functionality and vice versa."

SUMMARY OF THE INVENTION

The present invention is directed to a capacitive touch sensor integrated with LCD display that substantially obviates one or more of the problems due to limitations and disadvantages of the related art.

An object of the present invention is to provide a capacitive touch sensor that has a simple structure and is easy to manufacture.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides capacitive touch sensitive panel which includes: a display panel including a plurality of display elements forming a matrix, a first set of signal lines coupled to the plurality of display elements, and a second set of signal lines coupled to the plurality of display elements, the display panel having a top surface; a driver circuit for driving the first and second sets of signal lines, wherein the driver circuit drives the first set of signal lines with a drive signal that includes alternating first and second time periods, the first time periods containing data signals and the second time periods containing excitation signals for the touch sensitive panel; a sensor layer having a single layer of transparent sensor traces formed above the top surface the display panel; and a touch sensor circuit electrically coupled to the transparent sensor traces of the sensor layer for controlling and processing signals from the sensor traces.

Preferably, the sensor layer includes the single layer of transparent sensor traces formed on a flexible substrate, and wherein the flexible substrate is boned to the top surface of the display panel.

In another aspect, the present invention provides a sensing method using a capacitive touch sensitive panel including a display panel, the display panel including a plurality of display elements forming a matrix, a first set of signal lines coupled to the plurality of display elements, a second set of signal lines coupled to the plurality of display elements, and a sensor layer having a single layer of transparent sensor traces formed above a top surface the display panel, the method including: driving the first set of signal lines of the display panel with a drive signal that includes alternating first and second time periods, the first time periods containing data signals and the second time periods containing excitation signals for the touch sensitive panel; and sensing the excitation signal during the second time periods using the sensor layer.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide a capacitive touch sensor (also referred to as touch sensitive panel or screen) that includes an LCD panel and a single layer of transparent conductive traces above the LCD panel. One group of signal traces of the LCD panel, either the gate signal traces or the source signal traces, is used to emit signals that function as the excitation signals of the touch sensor, and the single layer of transparent conductive traces above the LCD panel is used to detect the signals to sense touches. The single layer of transparent conductive traces may be formed on a flexible medium and affixed to the upper surface of the LCD panel. The LCD panel is similar to a conventional LCD panel except that the driver circuit is modified so that the gate or source signals are used, in a time-division manner, as excitation signals of the touch sensor.

Figure 1:
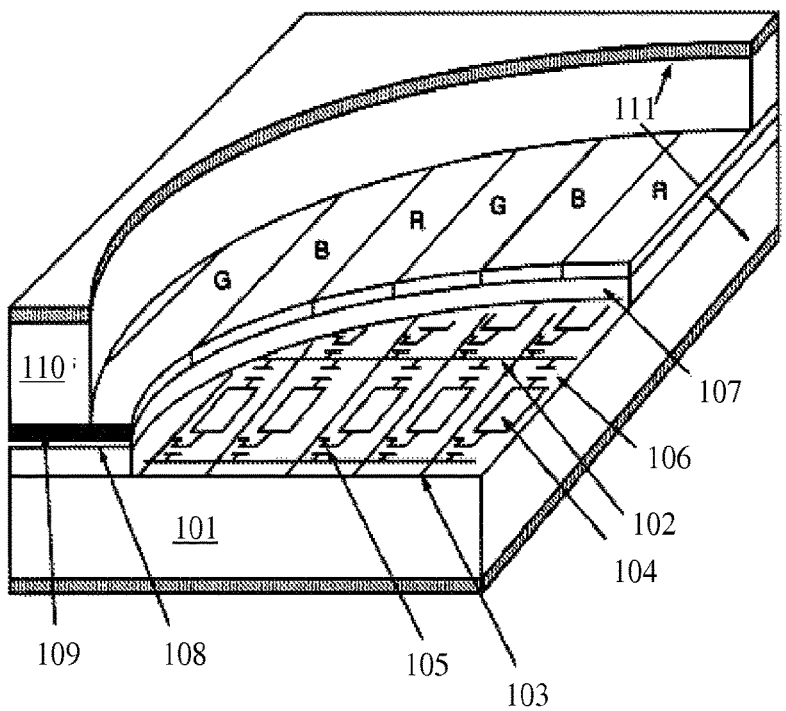
FIGS. 1 to 4 illustrate the structure of conventional LCD panels.
Figure 2:
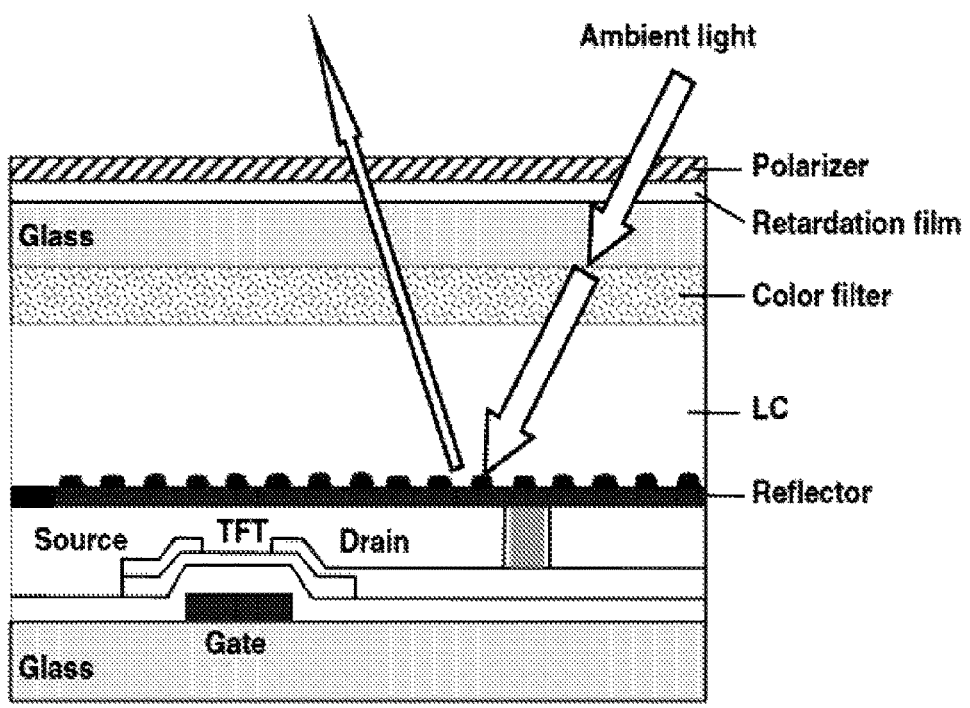
Figure 3:
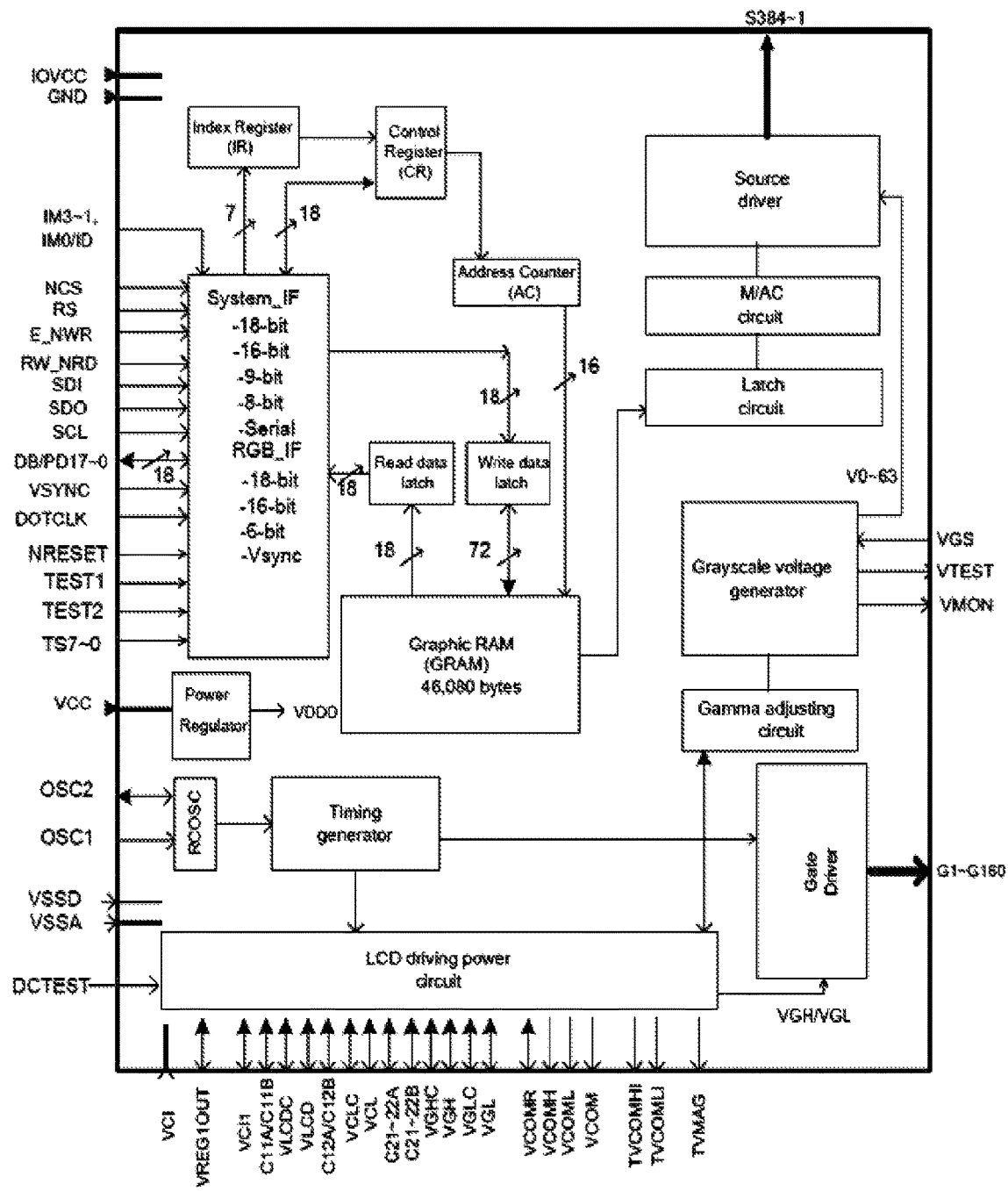
Figure 4:
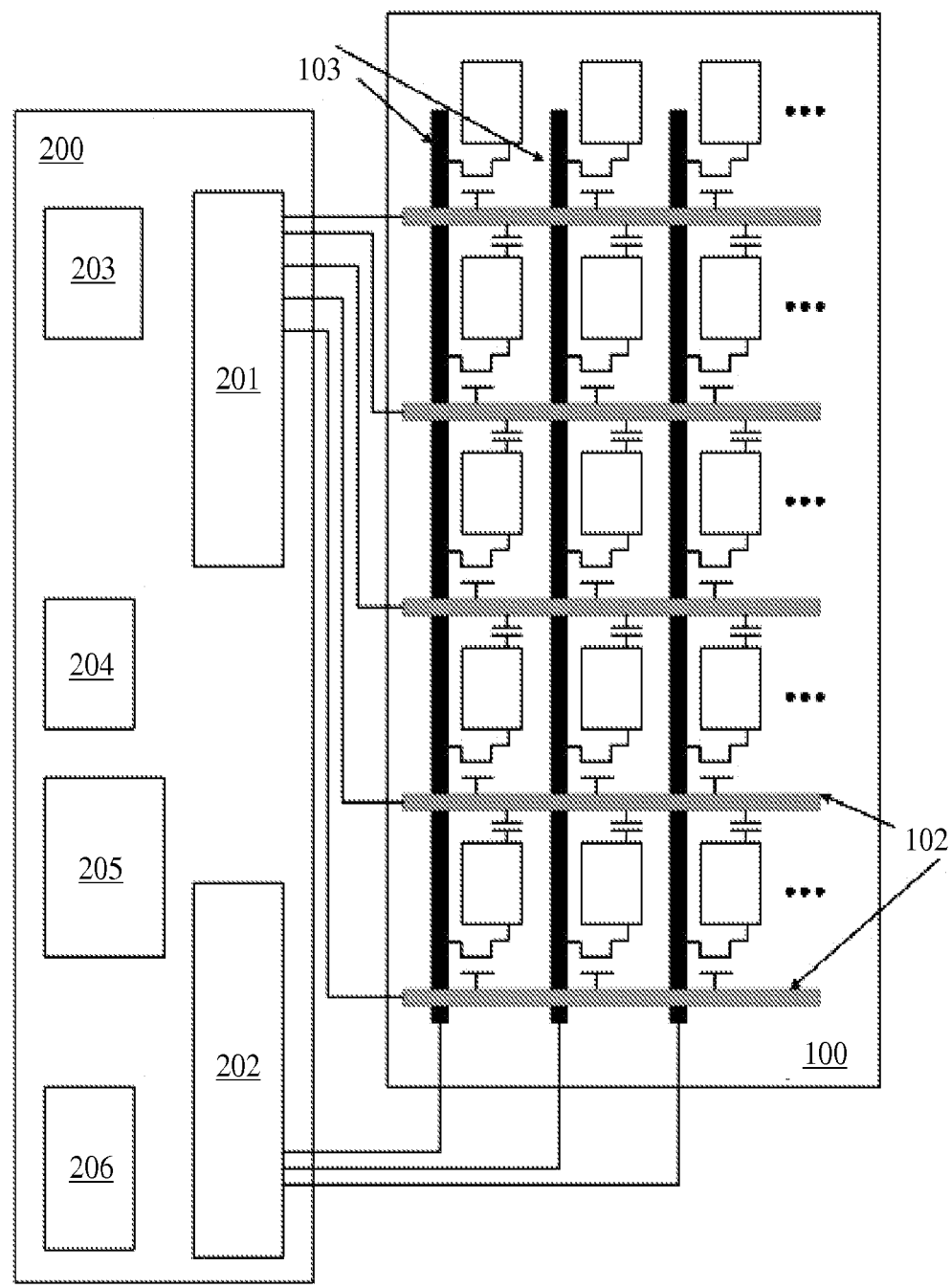

A conventional LCD display panel typically includes a TFT switch matrix which drives the liquid crystal display. In the TFT switch matrix, there are two groups of signals; in one direction is the gate (also referred to as select) signals, and in other directions is the source (also referred to as data) signals. Both these signals are switched at high speed to turn the liquid crystal light valve (the TFTs) on and off at each pixel location. A conventional LCD panel is shown in FIGS. 1-4. FIGS. 1 and 2 illustrate the structures of exemplary LCD panels. FIG. 3 shows an exemplary LCD driver chip. FIG. 4 is a schematic diagram showing the LCD panel and the LCD driver chip and their electrical connections. The structures of conventional LCDs illustrated in these figures are familiar to those skilled in the relevant art.

Specifically, as schematically illustrated in FIG. 1, the LCD panel includes a first glass substrate 101, a layer of active components 102-106 disposed on the first glass substrate, a layer of liquid crystal material 107 over the active layer, a common electrode layer (ITO) 108 over the liquid crystal layer, a filter layer 109 including a patterned array of primary color filters over the common electrode layer, and a second glass substrate 110. The layer of active components includes a plurality of parallel gate (select) lines 102, a plurality of parallel source (data) lines 103 preferably perpendicular to the gate lines, a plurality of pixel electrodes 104 each corresponding to an intersection of one gate line and one source line, a plurality of TFTs (thin film transistors) 105 each corresponding to a pixel electrode and connected to the corresponding gate line, source line and pixel electrode, and a plurality of storage capacitors 106 each corresponding to a pixel electrode and connected between the pixel electrode and a gate line. The LCD panel may additionally include polarizers 111 on the outside of the first and second glass substrates 101 and 110.

The above described structure forms a transmission-type LCD panel. In a reflection-type LCD panel, schematically illustrated in FIG. 2, a reflective layer is provided below the liquid crystal layer. The touch sensor can be applied to both types of LCD panels.

FIG. 4 schematically illustrates a TFT layer 100 and an LCD driver chip 200 connected to the various signal lines of the TFT layer (the other structures such as the substrates, the liquid crystal, etc. are not shown in FIG. 4). The LCD driver chip 200 includes gate drivers 201 connected to the gate lines 102 of the TFT layer, source drivers 202 connected to the source lines 103 of the TFT layer, as well as other circuits including logic and timing control circuit 203, memory module 204, interface module 205, power module 206, etc. interconnected to each other as appropriate (not shown).

In embodiments of the present invention, the LCD panel has a structure similar to a conventional LCD, except that the LCD driver circuitry is modifies to drive the gate lines or the source lines to emit the excitation signal.

Figure 5:
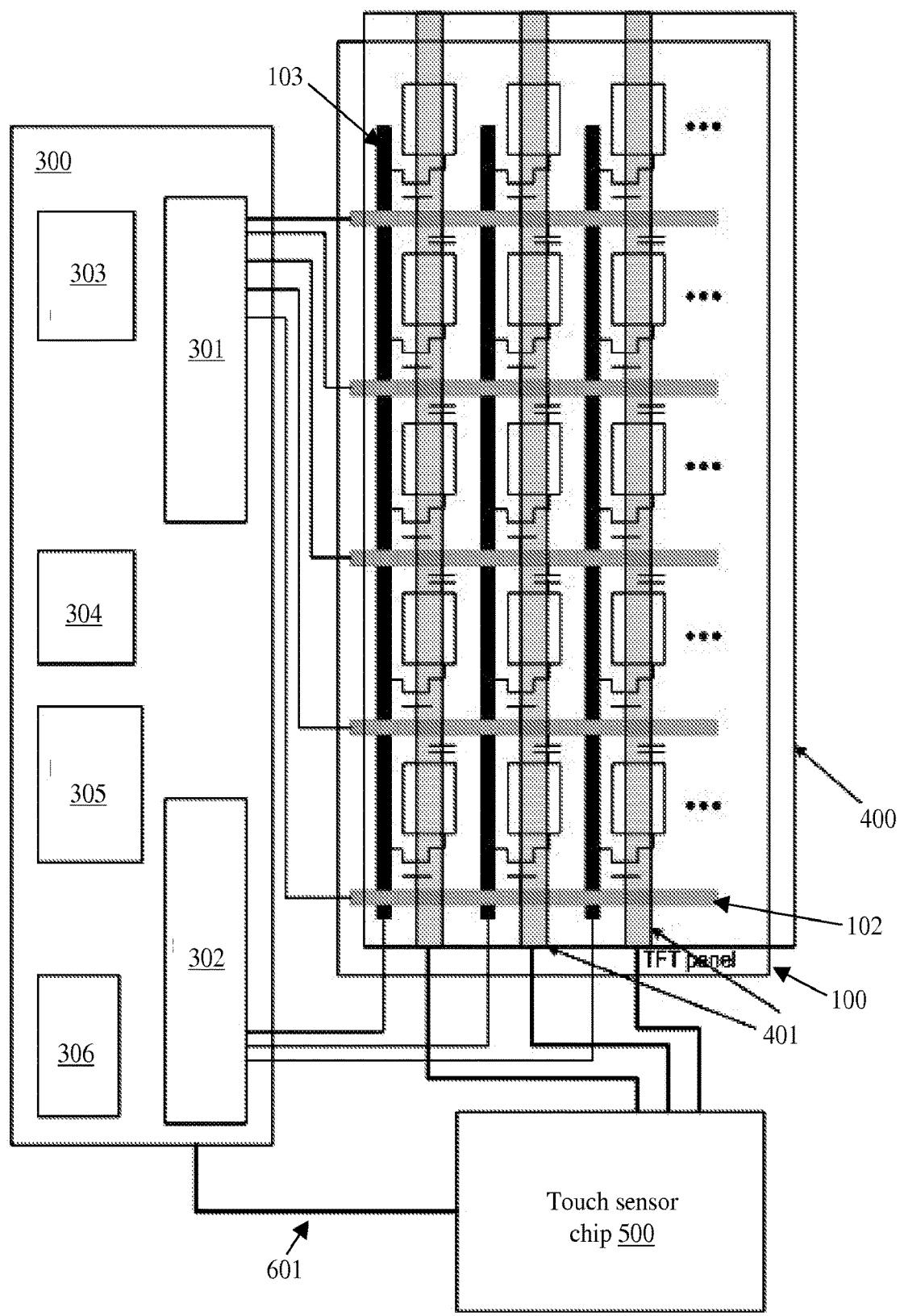
FIGS. 5 to 7 illustrate the structure of a touch sensitive panel according to an embodiment of the present invention.
Figure 6:
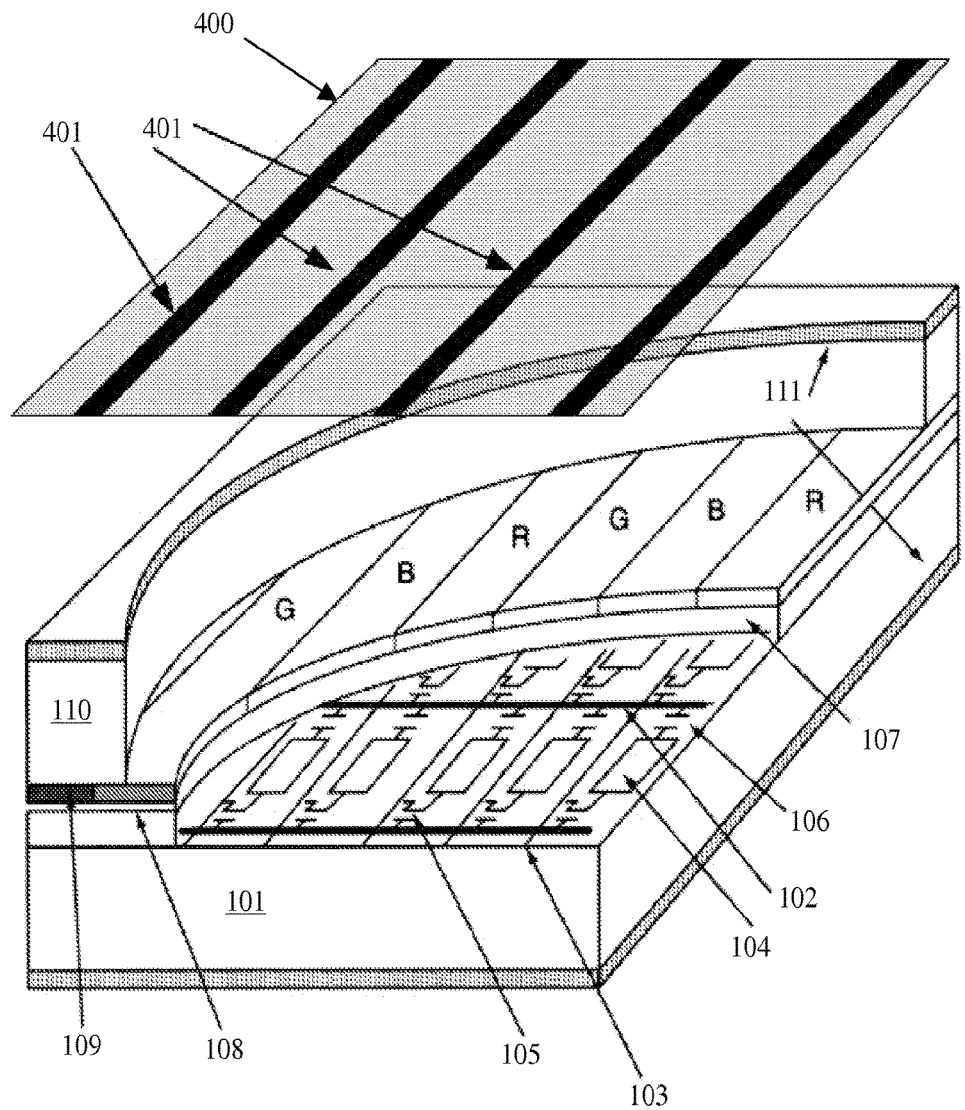

FIGS. 5 and 6 schematically illustrate a touch sensitive panel according to an embodiment of the present invention. FIG. 5 is based on the TFT layer shown in FIG. 4, and FIG. 6 is based on the LCD panel shown in FIG. 1. In FIG. 5, the touch panel includes a TFT layer 100 having gate (select) lines 102 and source (data) lines 103, which is the same as that shown in FIG. 4, but one of the gate drivers 301 and source drivers 302 of the LCD driver circuit (LCD driver chip) 300 is modified as will be described in more detail later. The other components of the LCD driver circuit 300, including the other one of the gate drivers 310 and source drivers 302, the logic and timing control circuit 303, memory module 304, interface module 305, and power module 306 are similar or identical to the corresponding components 203-206 of the conventional LCD panel shown in FIG. 4.

The touch sensitive panel further includes a sensor layer 400 with a single layer of transparent sensor traces 401, and a touch sensor circuit (touch sensor chip) 500 electrically coupled to the transparent sensor traces of the sensor layer for controlling and processing (including amplifying) signals from the sensor traces. In this illustrated embodiment, the touch sensor chip 500 is additionally electrically connected to the LCD driver chip 300 via a signal line 601. In an alternative structure (not shown), the touch sensor chip 500 is not electrically connected to the LCD driver chip 300 (as will be explained later). In yet another embodiment, the components of the touch sensor chip 500 and the LCD driver chip 300 may be integrated on a single IC chip.

The sensor layer 400 includes a single layer of patterned ITO traces 401. Physically, several configurations may be used. In a first configuration, the single layer of patterned ITO traces is formed directly on a top surface of the LCD panel, such as on the surface of the color filter. In a second configuration, the single layer of patterned ITO traces is formed on a separate substrate, preferably a flexible substrate such as a flexible circuit board, and the substrate is placed over the LCD panel or over a protective glass layer of the relevant device (e.g. a smart phone or tablet computer). In a third configuration, the single layer of patterned ITO traces is formed directly on the protective glass layer of the device (the smart phone or tablet computer). Other configurations may also be used. Note that in FIG. 5, the TFT layer 100 and the sensor layer 400 are shown as being offset, but this is only for the convenience of illustration; they are in fact aligned with each other in the preferred embodiments.

In FIG. 6, components 101-111 are identical to components 101-111 of FIG. 1, and the sensor layer 400 with patterned ITO traces 401 is overlaid on the LCD panel (the sensor layer 400 is shown here in a partially exploded view with respect to the LCD panel).

Figure 8:
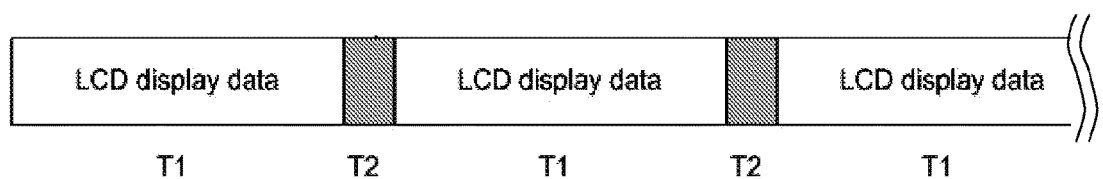
FIG. 8 illustrate a timing sequence of the gate or source drive signal of the touch sensitive panel according to an embodiment of the present invention.

In the touch panel according to embodiments of the present invention, the excitation signals for the touch sensor are emitted by the gate or source lines of the TFT layer which are driven by the LCD driver circuit, either the gate line driver or the source line driver, in a time-division manner. FIG. 8 shows an exemplary timing sequence, where the drive signals for the gate or source lines are divided into alternating time periods, i.e. time periods T1 containing the LCD display data and time periods T2 containing the touch screen excitation signal. The respective lengths of the two periods may be, for example 12 ms and 4 ms, or any other suitable time durations. The shape of the LCD drive signals during T1 can be any shape suitable for driving the gate or source lines of the LCD panel; the shape of signals during T1 can be any shape suitable for touch sensor excitation signals. Thus, the gate drivers or source drivers in the LCD driver chip are designed to drive the gate or source line in this fashion. During time periods T1, the gate and source drivers drive the TFTs using the data signal to display an image. During time periods T2, the gate or source lines emit sensing signals which are detected by the sensor layer 400.

In above-mentioned U.S. Pat. No. 7,995,041, a similar time-division scheme is used (although the overall structure of the touch panel is much different from that described here); FIGS. 11A and 11B of that patent shows an example of LCD drive signal and touch sensor excitation signal, which may be use to implement embodiments of the present invention.

Figure 7:
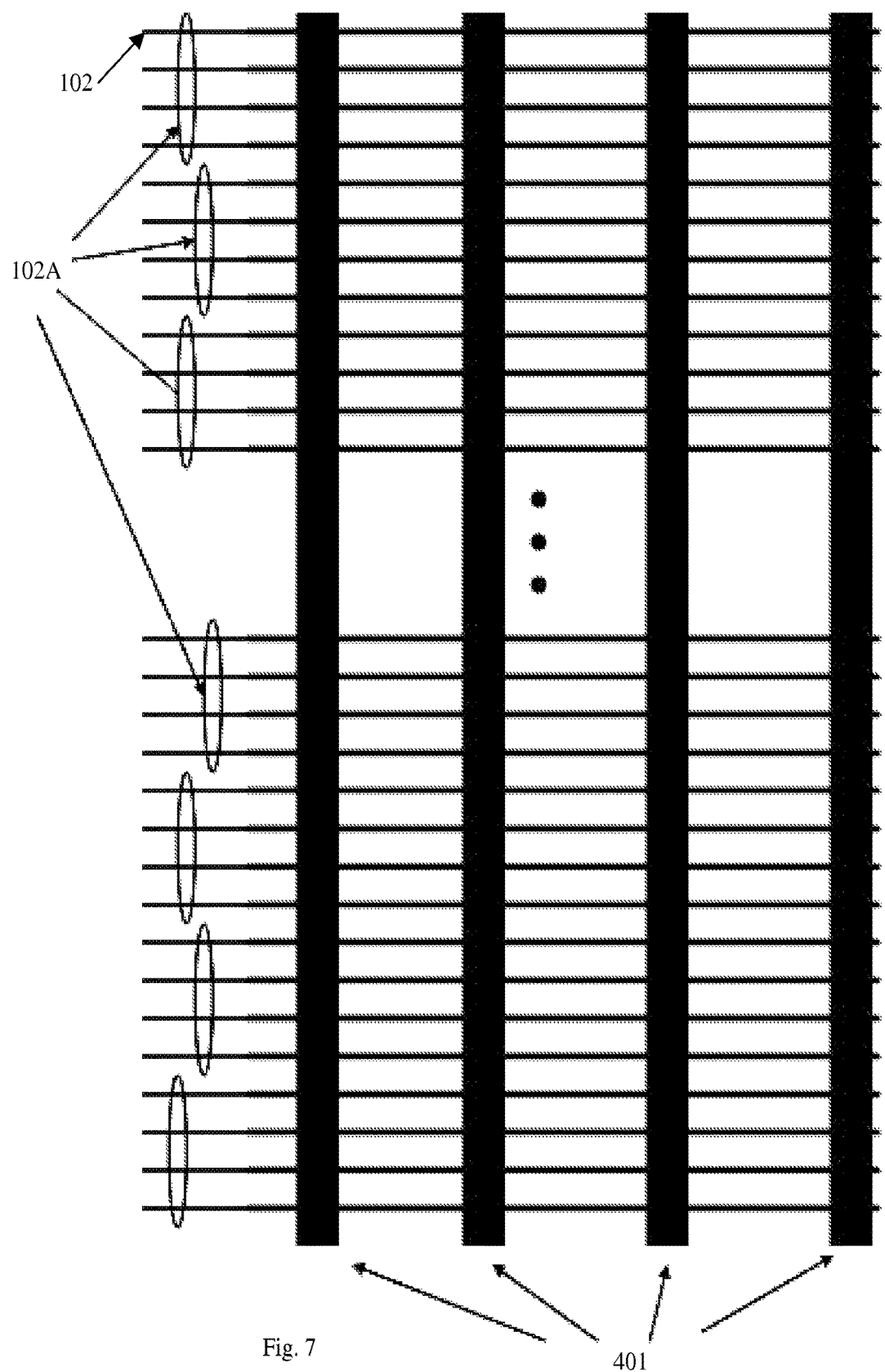

As schematically illustrated in FIG. 7, a number of gate (or source) lines 102 of the LCD panel may be grouped to emit the same excitation signal in each group 102A for touch sensing. The number of lines 102 in each group 102A may be determined based on the pixel size of the LCD panel and the desired spatial resolution of the touch sensor.

A conventional touch sensor chip includes a driving section for generating drive signals for the dedicated excitation traces, and a detecting section for receiving and processing detected signals from the detecting traces. The touch sensor circuit according to embodiments of the present invention does not require the dedicated excitation traces and corresponding driving section (the gate or source lines of the LCD are used to emit excitation signals), but it does includes a detecting section (touch sensor circuit 500) which may be similar to the detecting section of a conventional touch sensor chip. The implementation of such detecting section is within the ability of those of ordinary skill in the art. The principles of the touch sensing operation is the same as in the conventional capacitive touch sensors which use a dedicated layer traces to emit excitation signals and another layer of traces to detect these signals, except that touch sensing operation only occurs during the time periods T2.

In embodiments of the present invention, the electronic circuits of the touch sensitive panel may be implemented with different configurations. In a first implementation, shown in FIG. 5, the touch sensor circuitry 500 is electrically coupled to the LCD driver circuit 300 and receives timing signals about the time-divided LCD gate or source drive signal (see FIG. 8) from the latter, via a signal line 601. The touch sensor circuitry 500 uses such timing signals to synchronize the control and signal processing for the sensor layer 400 (e.g., it processes signals detected on the sensor traces only during the time period T2). A variation of such implementation is that the touch sensor circuitry 500 provides timing signals via the signal line 601 for LCD driver circuitry 300 to start the touch excitation signal sequence (e.g. time periods T2 in FIG. 8). In a second implementation (not shown), the LCD drive circuit and the touch sensor circuit are integrated on one IC chip. Timing signals may be appropriated provided to the LCD driving circuit and the touch sensor circuit from a common timing control circuit. In a third implementation, the touch sensor excitation signals are contains a pre-defined fixed sequence to function as timing signals (sync); the touch sensor chip detects this timing signals from the sensed excitation signal, and uses it to automatically synchronize its own functions with the excitation signal. In this implementation, no direct wire connections between the LCD drive circuitry 300 and the touch sensor circuitry 500 is required, and the timing signals is exchanged in a wireless manner through signals on the LCD gate or source traces.

Conventional LCD displays may be either a passive type or an active TFT switched type; the touch sensing principles described above can be use with both of these types of LCD displays.

Figure 9:
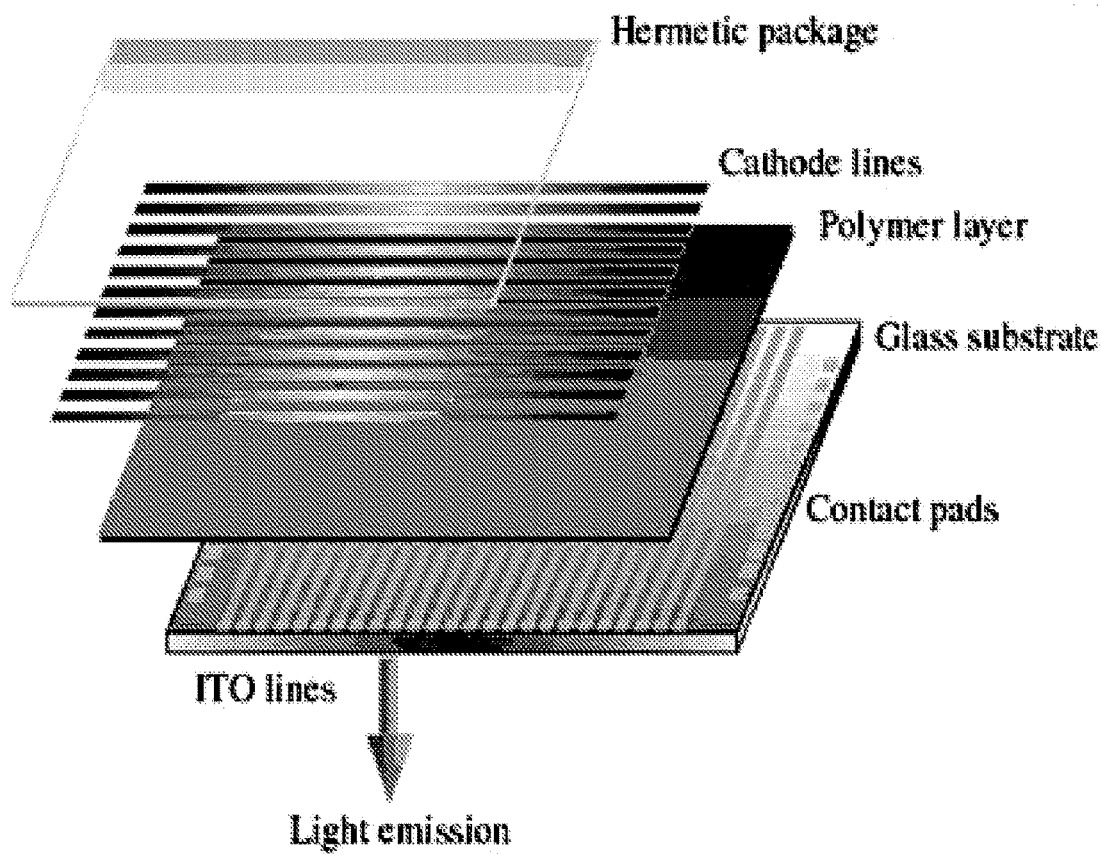
FIGS. 9 to 11 illustrate the structure of conventional OLED panels.
Figure 10:
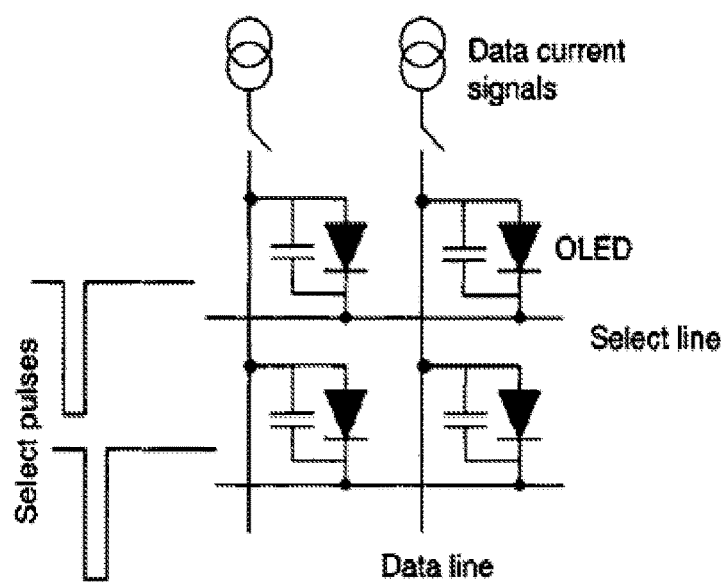
Figure 11:
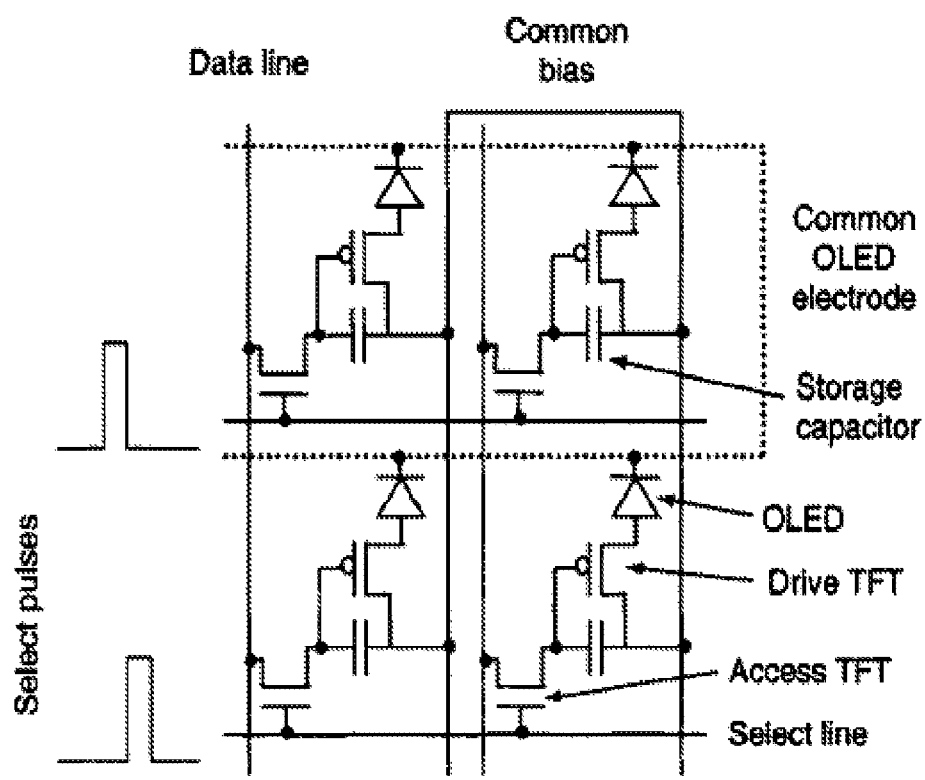

The touch sensing principles described above can also be applied in OLED (organic light-emitting diode) displays (both passive and active TFT switched types). FIG. 9 schematically illustrates the structure of a conventional OLED display, which includes an x-y matrix to drive the LEDs (light-emitting diode) in between. As shown in FIG. 9, the OLED panel includes a glass substrate having ITO lines and contact pads formed thereon, a light emitting polymer layer, a layer of cathode lines, and a package cover. FIGS. 10 and 11 schematically illustrate the structures of a passive matrix and a TFT switch matrix for OLED displays, respectively. As shown in FIGS. 10 and 11, an OLED panel (either passive type or the active TFT switched type) has a set of data lines and a set of select lines to drive the pixels to form an image. To provide for capacitive touch sensing for either type of OLEDs, one set of drive lines of the OLED, either the select lines or data lines, can be used to generate touch sensor excitation signals in a time-division manner in accordance with the principles described above. A sensor layer with a single layer of transparent sensor traces and a touch sensor circuit similar to those shown in FIGS. 5 and 6 are provided for sensing touch signals.

The capacitive touch sensor according to embodiments of the present invention may be considered to be partially integrated with the LCD or OLED display because a part of this function (the excitation signal generation) is integrated with the LCD or OLED display. Compared with the structures described in the Background section of this disclosure, the touch sensitive panel according to embodiments of the present invention greatly simplifies the construction of the capacitive touch sensor because only one dedicated layer of traces is needed for the touch sensing function. Moreover, the touch sensitive panel according to embodiments of the present invention has the advantage that it required no modification of the structure or fabrication process of the LCD or OLED panel itself; only the drive signals for the gate or source lines are modified.

It will be apparent to those skilled in the art that various modification and variations can be made in the capacitive touch sensor and related methods of the present invention without departing from the spirit or scope of the invention. Thus, it is intended that the present invention cover modifications and variations that come within the scope of the appended claims and their equivalents.

What is claimed is:

1. A capacitive touch sensitive panel comprising:
a display panel including a plurality of display elements forming a matrix, a first set of signal lines coupled to the plurality of display elements, and a second set of signal lines coupled to the plurality of display elements, the display panel having a top surface;
a driver circuit for driving the first and second sets of signal lines, wherein the driver circuit drives the first set of signal lines with a drive signal that includes alternating first and second time periods, the first time periods containing data signals and the second time periods containing excitation signals for the touch sensitive panel, wherein both the data signals in the first time periods and the excitation signals in the second time periods are applied to the first set of signal lines;

a sensor layer having a single layer of transparent sensor traces formed above the top surface of the display panel; and a touch sensor circuit electrically coupled to the transparent sensor traces of the sensor layer for controlling and processing signals from the sensor traces.

2. The capacitive touch sensitive panel of claim 1, wherein the sensor layer includes a substrate having the single layer of transparent sensor traces formed thereon, and wherein the substrate is boned to the top surface of the display panel.

3. The capacitive touch sensitive panel of claim 1, wherein the substrate is a flexible substrate.

4. The capacitive touch sensitive panel of claim 1, wherein the transparent sensor traces of the sensor layer are formed on the top surface of the display panel.

5. The capacitive touch sensitive panel of claim 1, wherein the display panel is an LCD (liquid crystal display) panel or an OLED (organic light emitting diode) display panel.

6. The capacitive touch sensitive panel of claim 1, wherein the plurality of display elements includes a plurality of TFTs (thin film transistors), and wherein the first set of signal lines are gate lines or source lines connected to the plurality of TFTs.

7. The capacitive touch sensitive panel of claim 1, further comprising a signal line coupling the driver circuit and the touch sensor circuit, wherein the driver circuit provides, via the signal line, a timing signal to the touch sensor circuit regarding the timing of the first and second time periods, and wherein the touch sensor circuit electrically controls and processes signals from the sensor traces according to the timing signal.

8. The capacitive touch sensitive panel of claim 1, further comprising a signal line coupling the driver circuit and the touch sensor circuit, wherein the touch sensor circuit provides, via the signal line, a timing signal to the driver circuit, and wherein the drive circuit determines the timing of the first and second time periods according to the timing signal.

9. The capacitive touch sensitive panel of claim 1, wherein the excitation signals in the second time periods include a pre-defined sequence, and wherein the touch sensor circuit detects the pre-defined sequence and uses it as a timing signal.

10. The capacitive touch sensitive panel of claim 1, wherein the excitation signals in the second time periods are identical for a subset of adjacent ones of the first sets of signal lines.

11. The capacitive touch sensitive panel of claim 1, wherein the top surface is located above the plurality of display elements, the first set of signal lines and the second set of signal lines.

12. The capacitive touch sensitive panel of claim 1, wherein the display panel is an LCD (liquid crystal display) panel or an OLED (organic light emitting diode) display panel.

13. A sensing method using a capacitive touch sensitive panel including a display panel, the display panel including a plurality of display elements forming a matrix, a first set of signal lines coupled to the plurality of display elements, a second set of signal lines coupled to the plurality of display elements, and a sensor layer having a single layer of transparent sensor traces formed above a top surface of the display panel, the method comprising:

driving the first set of signal lines of the display panel with a drive signal that includes alternating first and second time periods, the first time periods containing data signals and the second time periods containing excitation signals for the touch sensitive panel, wherein both the data signals in the first time periods and the excitation signals in the second time periods are applied to the first set of signal lines; and sensing the excitation signal during the second time periods using the sensor layer.

14. The sensing method of claim 10, wherein the plurality of display elements include a plurality of TFTs (thin film transistors), and wherein the first set of signal lines are gate lines or source lines connected to the plurality of TFTs.

15. The sensing method of claim 10, wherein the excitation signals in the second time periods are identical for a subset of adjacent ones of the first sets of signal lines.

16. The sensing method of claim 10, wherein the display panel is an LCD (liquid crystal display) panel or an OLED (organic light emitting diode) display panel.

17. The sensing method of claim 10, wherein the top surface is located above the plurality of display elements, the first set of signal lines and the second set of signal lines.

18. A capacitive touch sensitive panel comprising:

a display panel including a plurality of transistors forming a matrix, each transistor corresponding to a display element, a set of gate lines, each gate line coupled to a subset of the plurality of transistors at their gates, and a set of source lines, each source line coupled to a subset of the plurality of transistors at their sources, the display panel having a top surface;

a driver circuit for driving the gate lines and the source lines, wherein the driver circuit drives either the gate lines or the source lines with a drive signal that includes alternating first and second time periods, the first time periods containing data signals and the second time periods containing excitation signals for the touch sensitive panel, wherein both the data signals in the first time periods and the excitation signals in the second time periods are applied to the gate lines or both the data signals in the first time periods and the excitation signals in the second time periods are applied to the source lines;

a sensor layer having a single layer of transparent sensor traces formed above the top surface of the display panel; and a touch sensor circuit electrically coupled to the transparent sensor traces of the sensor layer for controlling and processing signals from the sensor traces.

19. The capacitive touch sensitive panel of claim 18, wherein the sensor layer includes a substrate having the single layer of transparent sensor traces formed thereon, and wherein the substrate is boned to the top surface of the display panel.

20. The capacitive touch sensitive panel of claim 18, wherein the transparent sensor traces of the sensor layer are formed on the top surface of the display panel.

\* \* \* \* \*